US008826504B1

(12) United States Patent
Slivon

(10) Patent No.: US 8,826,504 B1
(45) Date of Patent: Sep. 9, 2014

(54) DISC BRAKE PISTON RETRACTOR TOOL

(75) Inventor: George Slivon, Kenosha, WI (US)

(73) Assignee: A&E Incorporated, Racine, WI (US)

(*) Notice: Subject to any disclaimer, the term of this patent is extended or adjusted under 35 U.S.C. 154(b) by 181 days.

(21) Appl. No.: 13/545,463

(22) Filed: Jul. 10, 2012

Related U.S. Application Data

(60) Provisional application No. 61/560,975, filed on Nov. 17, 2011.

(51) Int. Cl.
*B23P 19/04* (2006.01)

(52) U.S. Cl.
USPC .................................. 29/239; 29/244; 29/270

(58) Field of Classification Search
USPC ............................ 29/244–255, 270, 278, 263
See application file for complete search history.

(56) References Cited

U.S. PATENT DOCUMENTS

| | | | | |
|---|---|---|---|---|
| 1,339,448 | A * | 5/1920 | Forsman et al. | 269/3 |
| 2,170,535 | A * | 8/1939 | Marsden | 81/6 |
| 5,018,261 | A | 5/1991 | Markous | |
| 5,269,053 | A | 12/1993 | Hicks | |
| 5,829,739 | A * | 11/1998 | Hofmann | 269/43 |
| 6,085,398 | A * | 7/2000 | Arch | 29/239 |
| 6,192,566 | B1 | 2/2001 | Dunum | |
| D457,795 | S * | 5/2002 | Mohammed et al. | D8/51 |
| 6,574,846 | B1 * | 6/2003 | Kang | 29/239 |
| 7,155,792 | B1 | 1/2007 | Miller, Jr. | |
| 7,996,972 | B2 * | 8/2011 | Hu | 29/252 |
| 8,393,063 | B2 * | 3/2013 | Hodges et al. | 29/239 |
| 2004/0134052 | A1 | 7/2004 | Ploeger et al. | |
| 2012/0204393 | A1 * | 8/2012 | Gentner et al. | 29/257 |

OTHER PUBLICATIONS

The Tool Warehouse, CalVan Tools 700 Heavy-Duty Universal Disc Brake Pad Spreader; .thetoolwarehouse.net/shop/media/TN-CAL-700.jpg; Jul. 3, 2008.
Alltools WA Pty Ltd: Online Shop; Disc brake pad spreader; .alltools.com.au/shop/index.php/556/2453_Disc_Brake_Pad_Spreader; Jul. 16, 2010.
Toolfetch; CalVan Tools 700 Heavy-Duty Universal Disc Pad Spreader; .toolfetch.com/Catagory/Automotive/Brake_Tools/CAL700.htm; Jul. 16, 2012.
Snap-on; Press,Brake Caliper; ://buy1.snapon.com/catalog/printPage/asp?tool-all&item_id=88695&PartNo-BTCP1; Dec. 10, 2010.

(Continued)

*Primary Examiner* — Lee D Wilson
(74) *Attorney, Agent, or Firm* — Ryan Kromholz & Manion, S.C.

(57) ABSTRACT

A disc brake piston retractor tool is provided for retracting at least one piston of a caliper assembly. The tool includes first and second pressure plates having respective externally threaded first and second studs. A coupler is internally threaded to threadably receive the first stud and the second stud from opposite open ends of the coupler. Selective rotation of the coupler results in simultaneous lateral movement of the first and second pressure plates towards and away from the coupler between retracted and extended positions. One of the pressure plates is engageable against the at least one piston to retract the piston, and the other of the pressure plates is supported against an interior surface of the caliper assembly opposite the one piston, or is engagable against at least one other piston in the caliper assembly opposite the one piston to retract the other piston.

14 Claims, 8 Drawing Sheets

(56) References Cited

OTHER PUBLICATIONS

Snap-on; Press, Brake Piston; ://buy1.snapon.com/catalog/printPage.asp?tool=all&Item_id=72215&PartNo-BT350' Dec. 10, 2010.

Snap-on; Spreader (for standard 4-piston caliper disc brakes); ://buy1.snapon.com/catalog/printPage.asp? tool=all &Item_id=12412&PartNo-GA395; Dec. 10, 2010.

Snap-on; Pad Spreader; ://buy1.snapon.com/catalog/printPage.asp?tool=all&Item_id=12411&PartNo=YA244; Dec. 10, 2010.

Snap-on; Tool, Universal Brake Caliper, Left Hand Thread, ://buy1.snapon.com/catalog/printPage.asp? tool=all&Item_id=75281 &PartNo=YA642; Dec. 10, 2010.

A&E Incorporate drawing sheet entitled Disc Brake Tool With Wrench; Part No. DV-3251; dated Feb. 21, 2011.

* cited by examiner 8C
18
44
16
46
48
50
52
54
56
58
60
62
64
66
68
70
72
74
76
78
80

DISC BRAKE PISTON RETRACTOR TOOL

CROSS REFERENCE TO RELATED APPLICATION

This application relates to and claims priority from U.S. Provisional Patent Application Ser. No. 61/560,975, filed Nov. 17, 2011.

FIELD OF THE INVENTION

The present disclosure relates generally to tools for changing disc brake pads on a disc brake caliper assembly. More particularly, the present disclosure pertains to a tool for moving or pressing a disc brake piston into a retracted position relative to a cylinder of the disc brake caliper assembly in order to allow the replacement of worn brake pads in the caliper assembly.

BACKGROUND OF THE INVENTION

In the repair of vehicles and, more particularly, with respect to the repair of vehicle braking systems having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a driver presses a brake pedal, brake fluid is forced from a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder(s) after which the brake pads can be replaced. The caliper housing can then be reinstalled in the wheel assembly and positioned with the new brake pads adequately accommodated in the caliper housing for engagement with the rotor.

A variety of spreader and brake press tools are known to be used by auto mechanics responsible for the repair of disc brakes and the replacement of brake pads. A difficulty with these tools, however, is the manual effort often required to effect retraction of the one or more pistons associated with the caliper housing. Accordingly, there remains a need in servicing brake pads to provide a tool for effectively retracting the one or more pistons of various caliper housing designs with improved mechanical advantage and ease of use.

SUMMARY OF THE INVENTION

The present disclosure relates to a disc brake piston retractor tool for retracting at least one piston into at least one cylinder bore of a caliper assembly provided with a set of brake pads to be serviced. The tool includes a first pressure plate having an outer surface, and an inner surface provided with an inwardly directed externally threaded first stud. A second pressure plate has an outer surface, and an inner surface provided with an inwardly directly externally threaded second stud. A coupler having opposite first and second open ends has an inner surface internally threaded to threadably receive the first stud from the first open end and the second stud from the second open end.

Selective rotation of the coupler results in threading and unthreading of the first and second studs, and simultaneous lateral movement of the first and second pressure plates towards and away from the coupler between retracted and extended positions. The outer surface of one of the pressure plates is engageable against the at least one piston to retract the one piston into the at least one cylinder bore, and the outer surface of the other of the pressure plates is supported against an interior surface of the caliper assembly opposite the one piston, or is engagable against at least one other piston provided for movement relative to at least one other cylinder bore in the caliper assembly opposite the one piston to retract the other piston into the at least one other cylinder bore.

In a preferred embodiment, a reversible ratcheting wrench assembly is connected to the coupler for providing selective rotation of the wrench assembly and coupler relative to the first and second externally threaded studs.

BRIEF DESCRIPTION OF THE DRAWINGS

The drawing illustrate the best mode presently contemplated in carrying out the disclosure.

In the drawings.

DETAILED DESCRIPTION OF THE INVENTION

Figure 1:
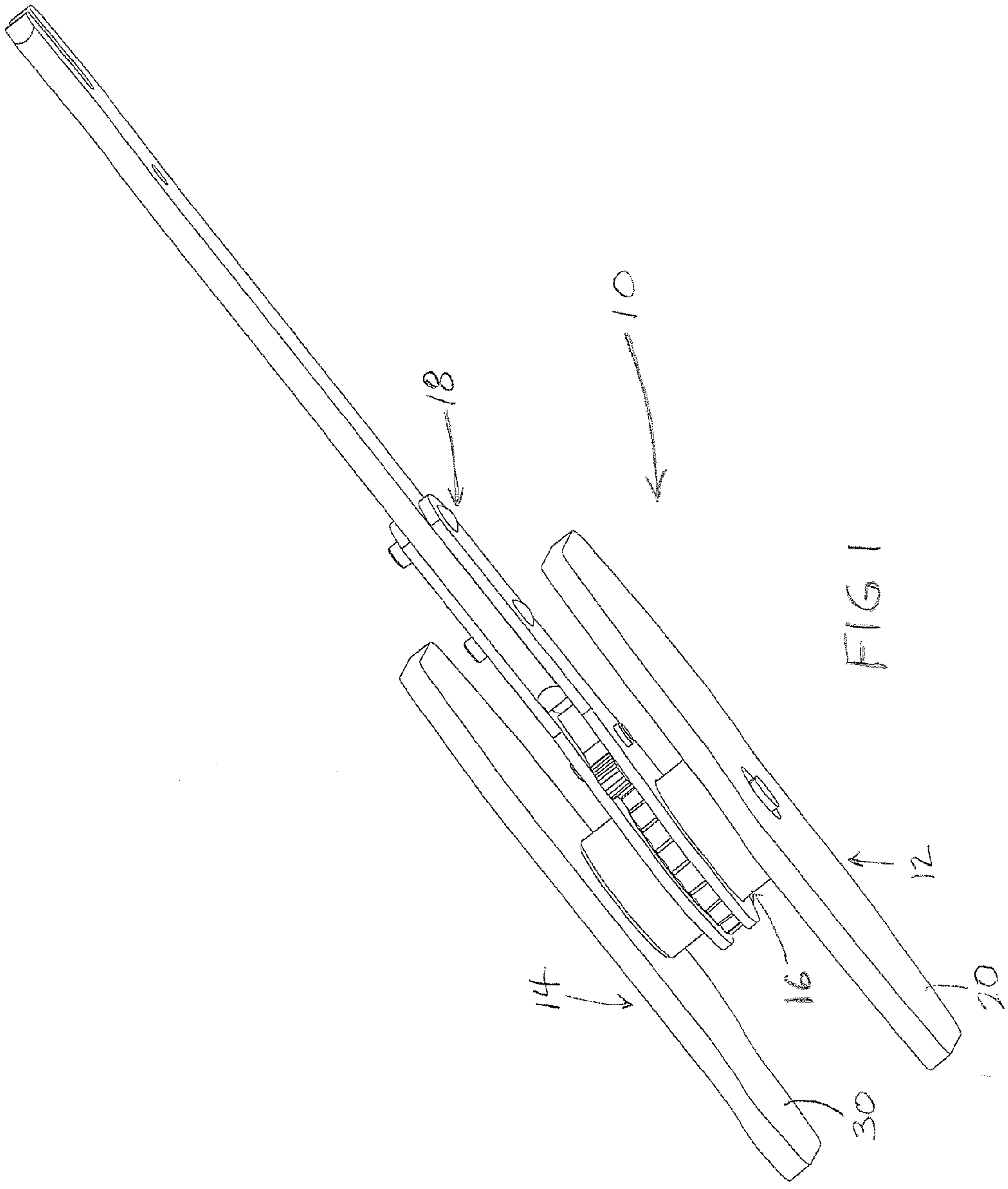
FIG. 1 is a perspective view of a disc brake piston retractor tool embodying the present disclosure.

Referring now to the drawings, FIG. 1 illustrates a hand tool in the form of a disc brake piston retractor tool 10 used for compressing one or more pistons into a caliper housing when replacing a set of brake pads installed therein.

The tool 10 is generally comprised of a first pressure plate 12, a second pressure plate 14, a coupler 16 interconnecting the first and second pressure plates 12, 14 and a reversible ratchet wrench assembly 18 connected to the coupler 16.

Referring to FIGS. 2-6, the pressure plates 12, 14 are substantially identical in shape and thickness and are preferably constructed of steel. Pressure plate 12 has an outer surface 20 and an inner surface 22 provided with an inwardly directed solid stud 24 welded thereto and formed with a left-hand thread 26. Pressure plate 14 has an outer surface 28 and an inner surface 30 provided with an inwardly directed hollowed stud 32 welded thereto and formed with a right-hand thread 34. The studs 24, 32 extend generally perpendicularly from the inner surfaces 22, 30 of the respective pressure plates 12, 14. The stud 24 has a length which is longer than the length of the stud 32, and has a threaded diameter which is smaller than the threaded diameter stud 32.

Figures 5, 6:
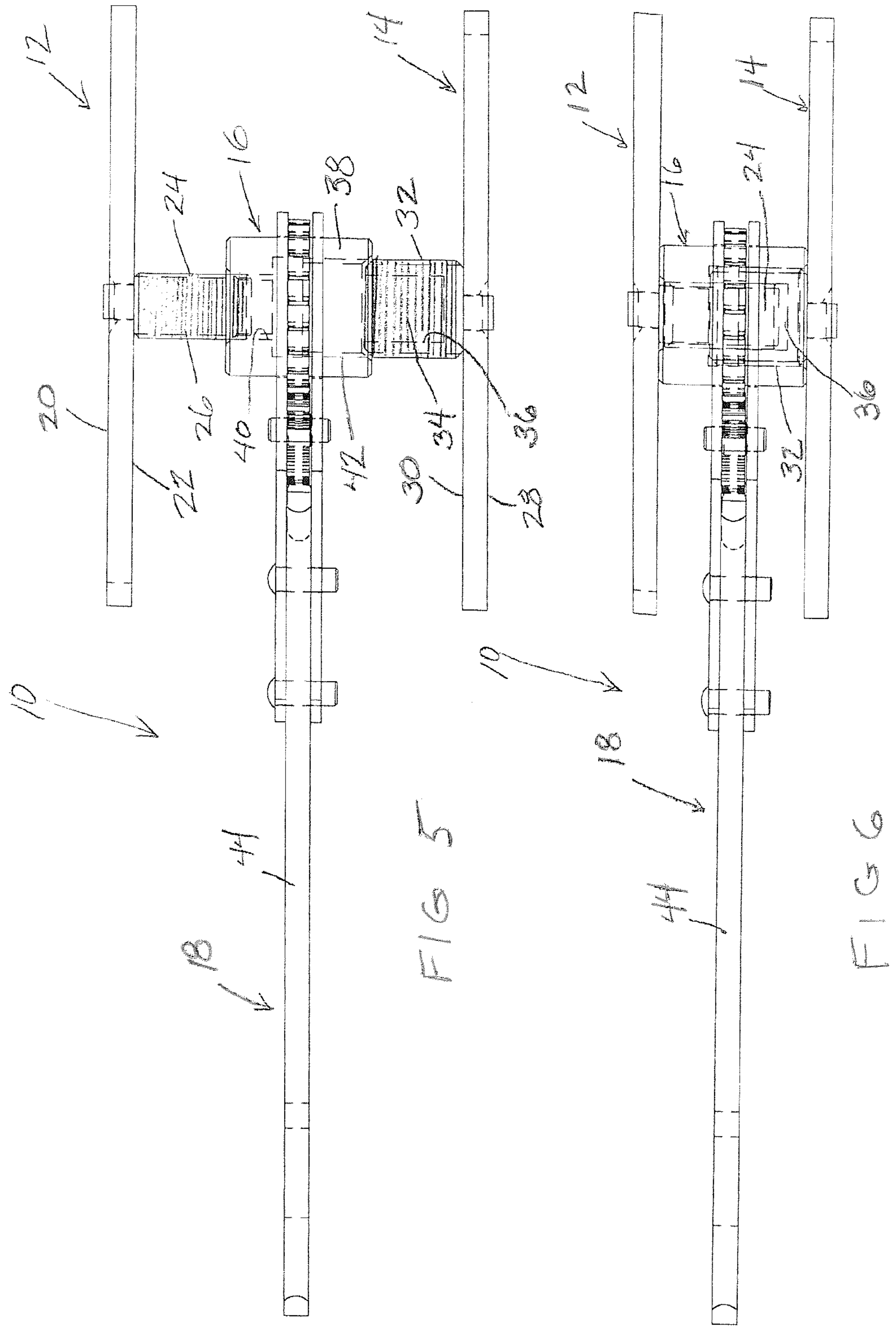
FIG. 5 is a top view similar to FIG. 3.
FIG. 6 is a top view similar to FIG. 4.

As best seen in FIGS. 5 and 6, the stud 32 is configured with a counterbore 36 adapted to receive an outer end of the threaded stud 24 when the tool 10 is assembled in a fully retracted position as will be more fully described below. Although not shown, a first O-ring is designed to encircle stud 24, and is to be fixed against the inner surface 22 of pressure plate 12. A second O-ring is designed to surround stud 32, and is to be secured against the inner surface of the pressure plate 14.

Figures 3, 4:
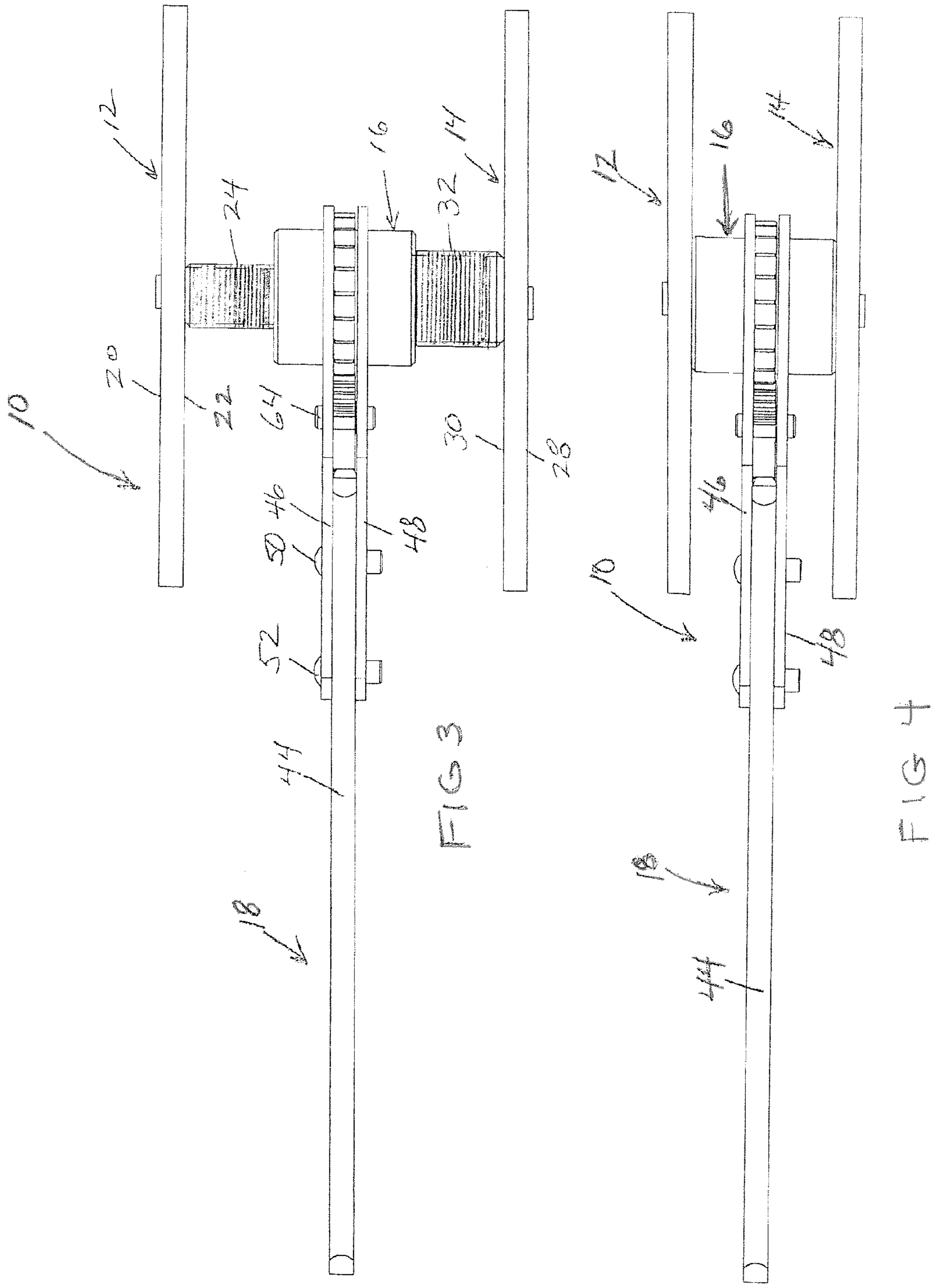
FIG. 3 is a top view of the disc brake piston retractor tool in an extended position.
FIG. 4 is a view similar to FIG. 3 showing the tool in a retracted position.

The coupler 16 has a cylindrical hollow body 38 provided with opposite open ends which are suitably internally threaded to matingly receive the threaded studs 24, 32. As may be appreciated from FIG. 5, the coupler 16 is internally threaded at 40 to receive stud 24, and is internally threaded at 42 to receive stud 32. Coupler 16 is thus rotatably mounted relative to the studs 24, 32 about an axis that is perpendicular to the pressure plates 12, 14. Because of the particular threaded relationship among the studs 24, 32 with the coupler 16, it should be understood that rotation of the coupler in clockwise or counterclockwise directions will result in simultaneous lateral movement of studs 24, 32 and the pressure plates 12, 14 to either an extended position of the tool 10 as illustrated in FIGS. 3 and 5, or a fully retracted of the tool 10 as illustrated in FIGS. 1, 4 and 6.

Figure 2:
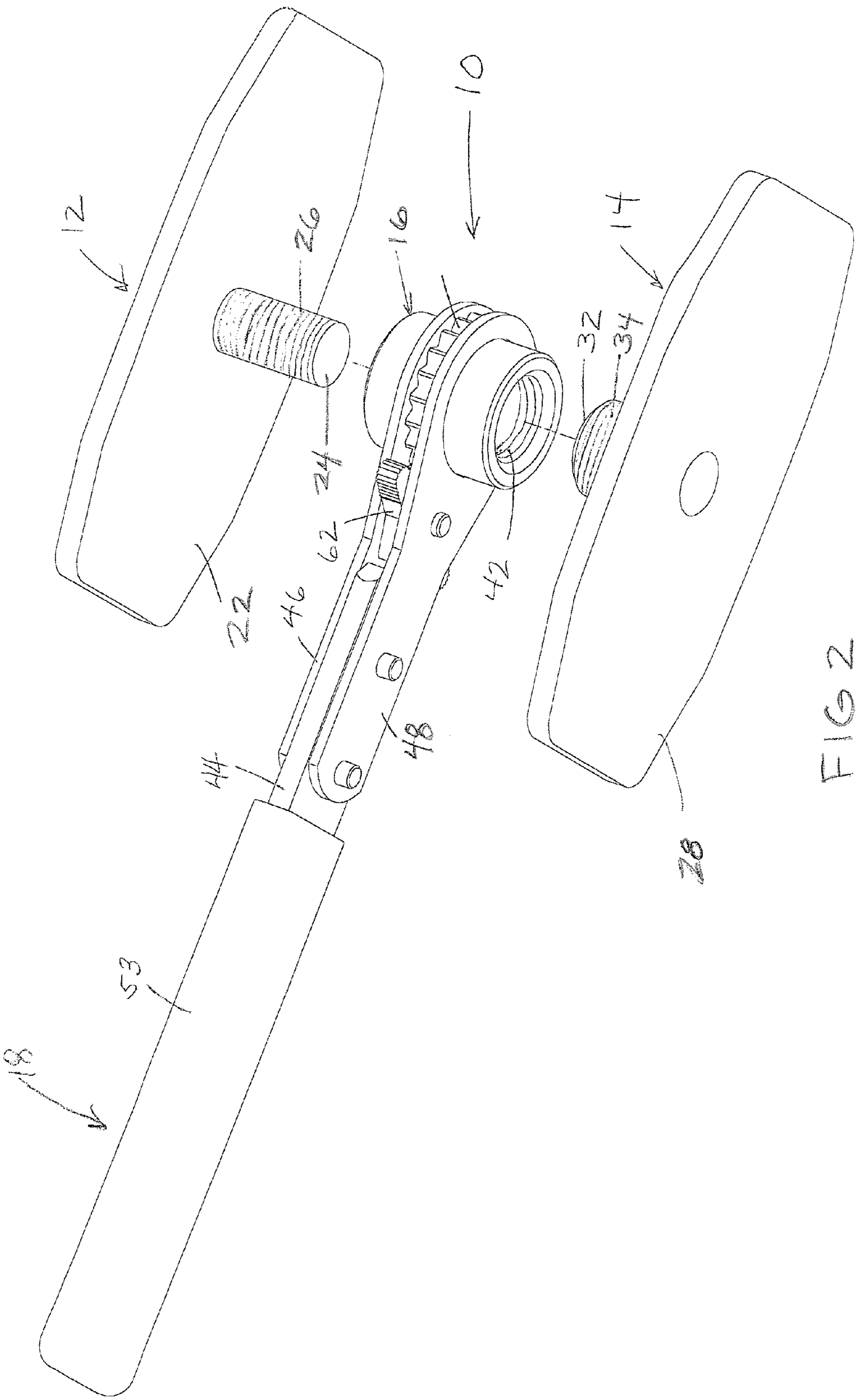
FIG. 2 is an exploded view of the disc brake piston retractor tool.
Figure 7:
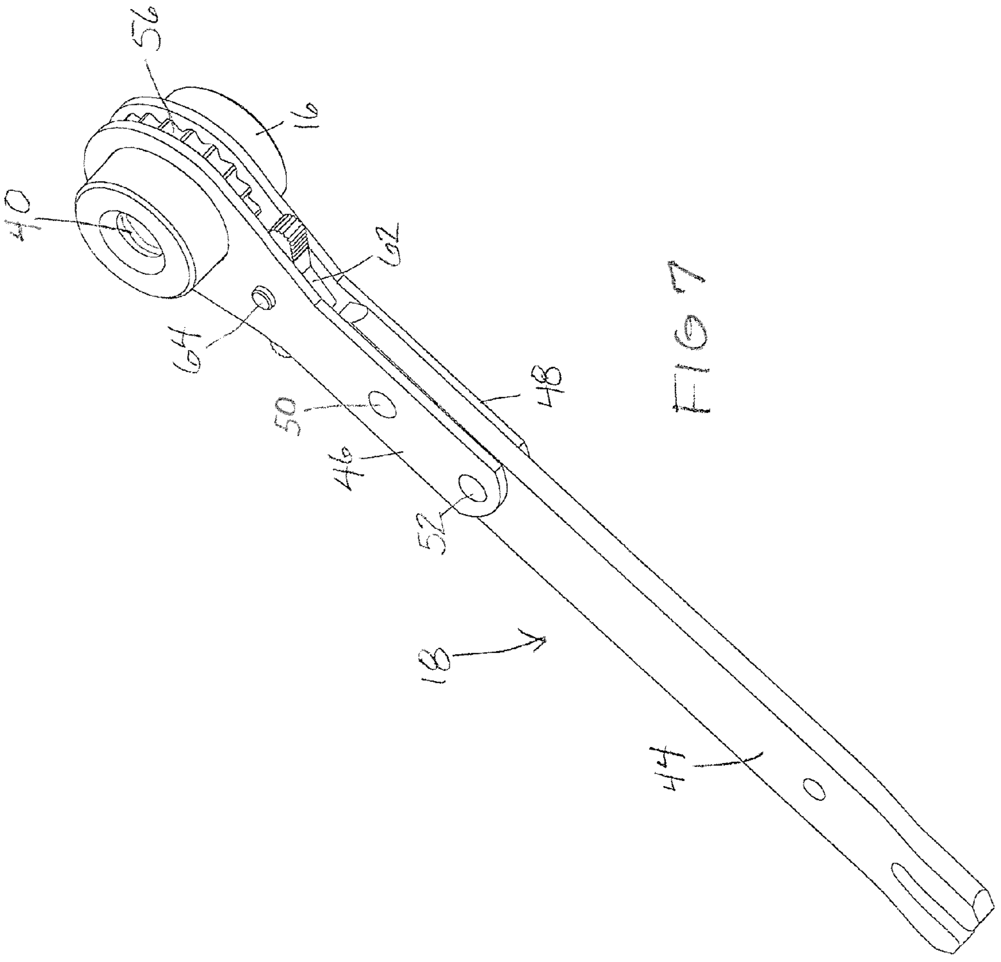
FIG. 7 is a perspective view of the ratchet wrench assembly and coupler portions of the tool of FIG. 1.
Figures 8, 8A, 8B, 8C:
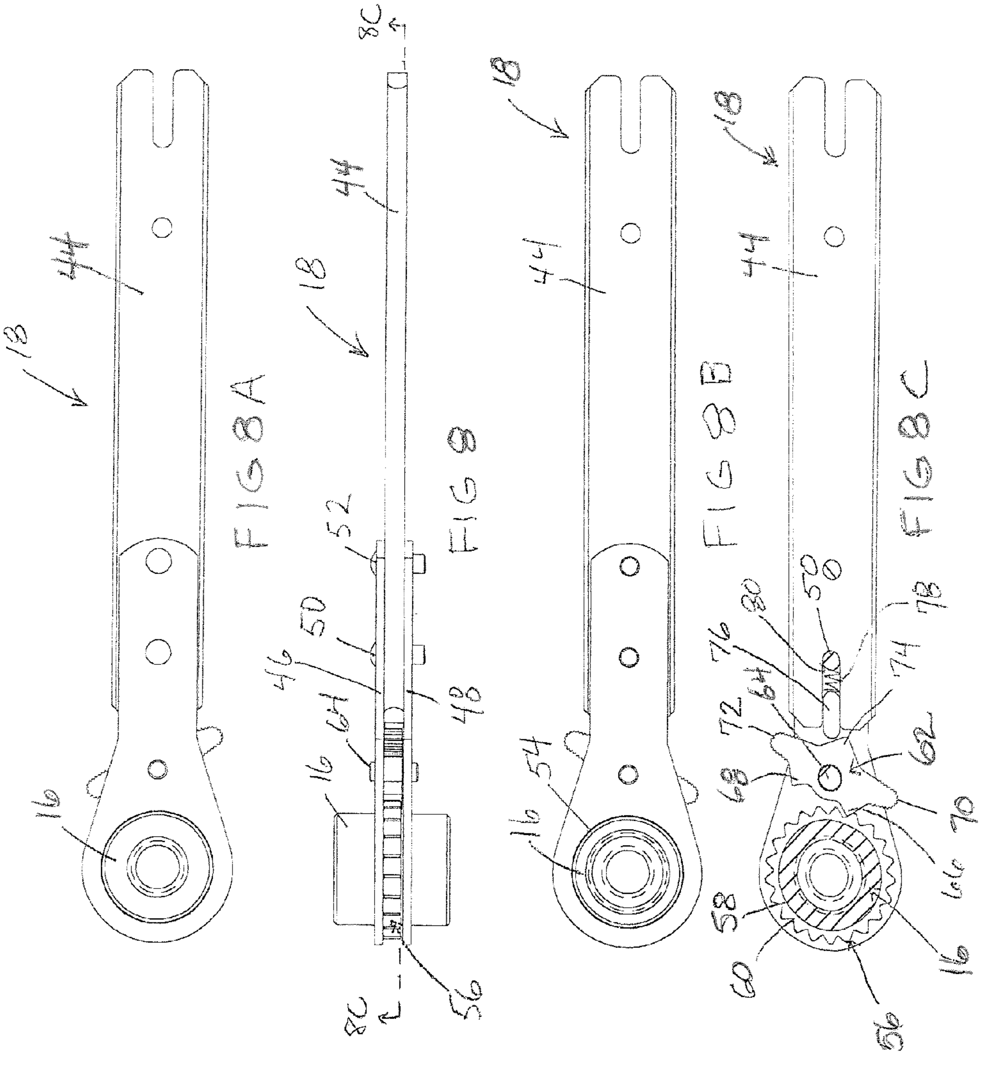
FIG. 8 is a plan view of the ratchet wrench assembly and coupler.
FIG. 8A is an elevational view taken from the top of FIG. 8.
FIG. 8B is an elevational view taken from the bottom of FIG. 8.
FIG. 8C is a sectional view taken on line 8C-8C of FIG. 8.

The reversible ratchet wrench assembly 18 shown in FIGS. 7 and 8-8C is incorporated into the tool 10 in order to simplify the bi-directional rotation of the coupler 16, and the selective movement of the pressure plates 12, 14. The reversible ratchet wrench assembly 18 includes an elongated spacer bar 44 which is rigidly interconnected between a first handle plate 46 and a second handle plate 48 by a pair of rivets 50, 52. A rearward or outer end of the spacer bar 44 is typically provided with a suitable cover material 53 (FIG. 2). The handle plates 46, 48 are held spaced apart at their front ends by the spacer bar 44, and are provided with aligned central apertures 54 which receive the coupler 16 so that the handle plates 46, 48 may rotate about the periphery of coupler 16 during ratcheting of the wrench assembly 18.

A ratcheting wheel 56 has a central hole formed by a circular inner wall 58 which is fixed to the outer surface of the coupler 16 in the center area thereof. The ratcheting wheel 56 has an outer periphery formed with a plurality of spaced apart ratchet notches 60. The ratcheting wheel 56 is positioned between facing inner surfaces of the spaced apart handle plates 46, 48, and is designed to rotate in fixed relationship with the coupler 16 relative to the studs 24, 32 threaded therein.

A reversible pawl 62 is mounted for pivotal movement between the spaced apart handle plates 46, 48 on a rivet 64 which further joins the handle plates 46, 48. As seen in FIG. 8C, the pawl 62 includes teeth 66, 68, a first engagement member 70, a second engagement member 72 and a nose 74. The teeth 66, 68 are engageable with various notches 60 on the ratcheting wheel 56 upon pivoting of the pawl 62. The engagement members 70, 72 project from the periphery of the spaced apart handle plates 46, 48 to afford manual manipulation to select the appropriate position of the pawl 62 for a desired torqueing direction. The pawl 62 is retained in a selected position by a plunger pin 76 which is biased or urged outwardly at one end against a surface of nose 74 by a resilient element, such as a spring 78, located between an opposite end of the plunger pin 76 and the rivet 50. The plunger pin 76 and the spring 78 are confined in a slot 80 formed in the spacer bar 44. The plunger pin 76 can be depressed by manipulation of the pawl 62 via the engagement member 70 or 72 to switch the pawl 62 from one side to the other during ratcheting movement of the wrench assembly 18.

When assembled, appropriate setting of the pawl 62 and rotation of the wrench assembly 18 will cause the studs 24, 32 to be threaded or unthreaded relative to the coupler 16 so that the spacing with the pressure plates 12, 14 can be adjusted between a fully retracted position (FIGS. 1, 4 and 6) and an extended position (FIGS. 3 and 5). The coupler 16 and the wrench assembly 18 are rotatable about an axis which is perpendicular to the pressure plates 12, 14.

Figure 9:
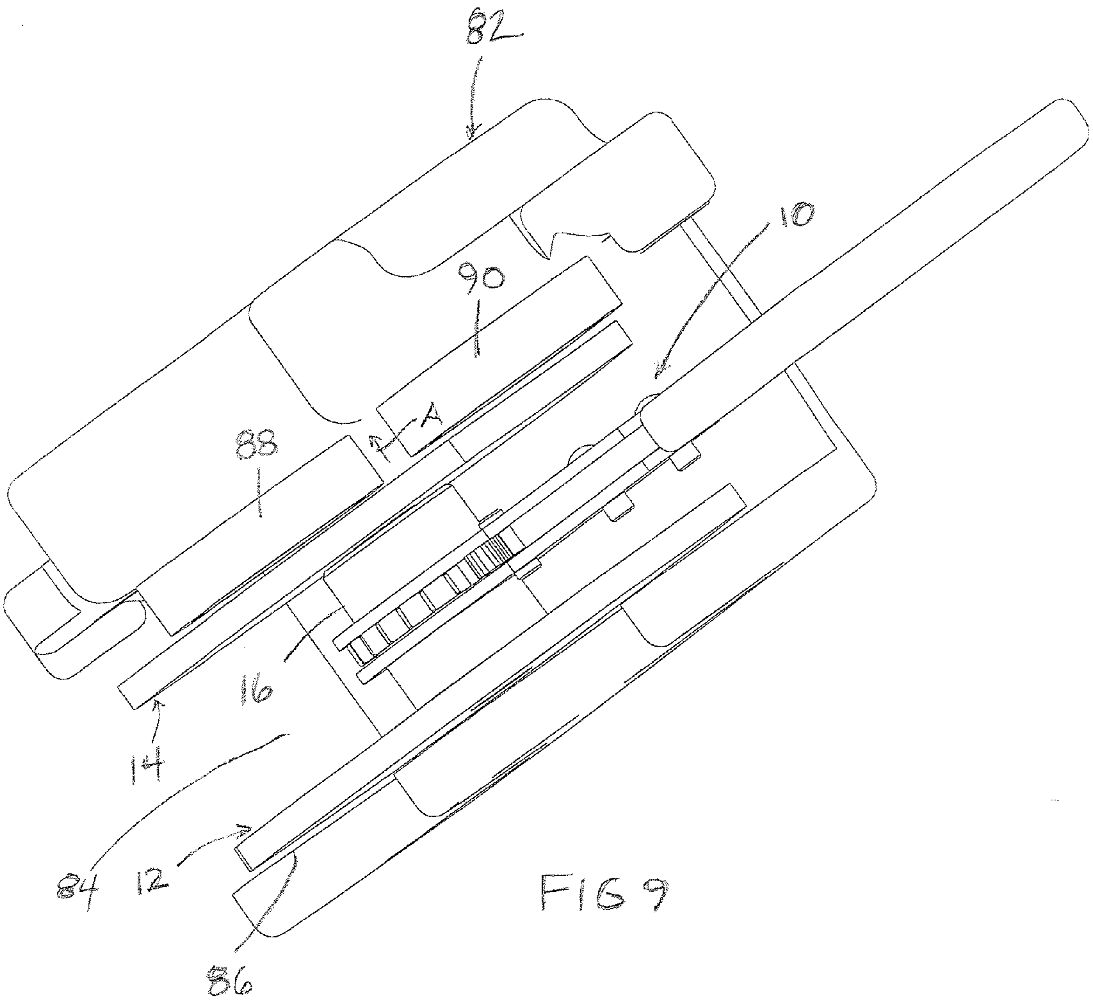
FIG. 9 is a view showing use of the tool in a caliper housing.

Use of the tool 10 is illustrated in FIG. 9. When it is desired to replace a set of worn brake pads, which preferably have been disassembled from a caliper housing 82 removed from a wheel assembly, the tool 10 in a retracted position is placed within an interior space 84 of the caliper housing 82 such that pressure plate 12 is engaged against a fixed wall 86 of the caliper housing 82, and pressure plate 14 is facing one or more of the outwardly extending pistons 88, 90 projecting opposite the fixed wall 86. The wrench assembly 18 is then operated to move the plates 12, 14 progressively outwardly towards the extended position in which pressure plate 14 pushes the one or more pistons 88, 90 back into their initial position (in the direction of arrow A) within their cylinder(s) associated with the caliper housing 82. Once the pistons 88, 90 have been retracted, the tool 10 can be removed from the caliper housing 82. The pressure on the pistons 88, 90 is usually inadequate or released such that pad mounting surfaces on the pistons 88, 90 remain in an acceptable spread condition. The brake pads may then be easily replaced and the caliper housing 82 may be reassembled with the wheel assembly.

Although not illustrated, it should be understood that certain caliper housings are designed with one set of pistons on one wall, and another set of pistons on another wall spaced from the one wall so that the sets of pistons are spaced apart and face each other. In this case, the tool 10 is placed in the caliper housing such that one pressure plate 12 is designed to push against and retract the one set of pistons into their respective cylinder bores, and the other pressure plate is designed to push against and retract the other set of pistons into their respective cylinder bores.

Figure 11:
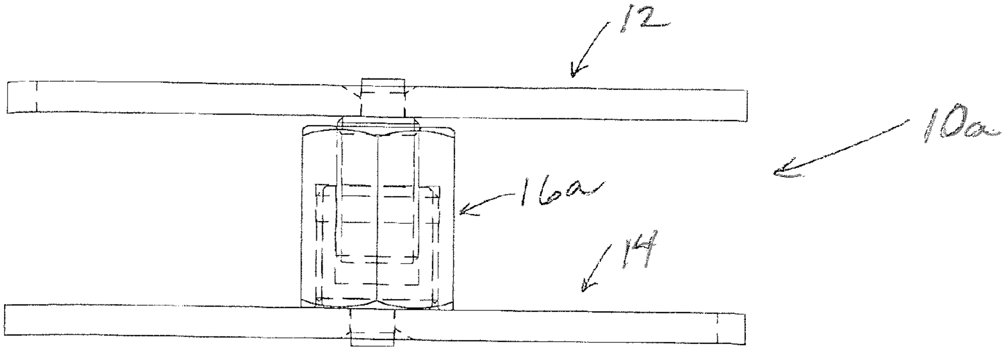
FIGS. 10 and 11 are top views of an alternate embodiment of the disc brake retractor tool shown in extended and retracted positions, respectively.
Figure 10:
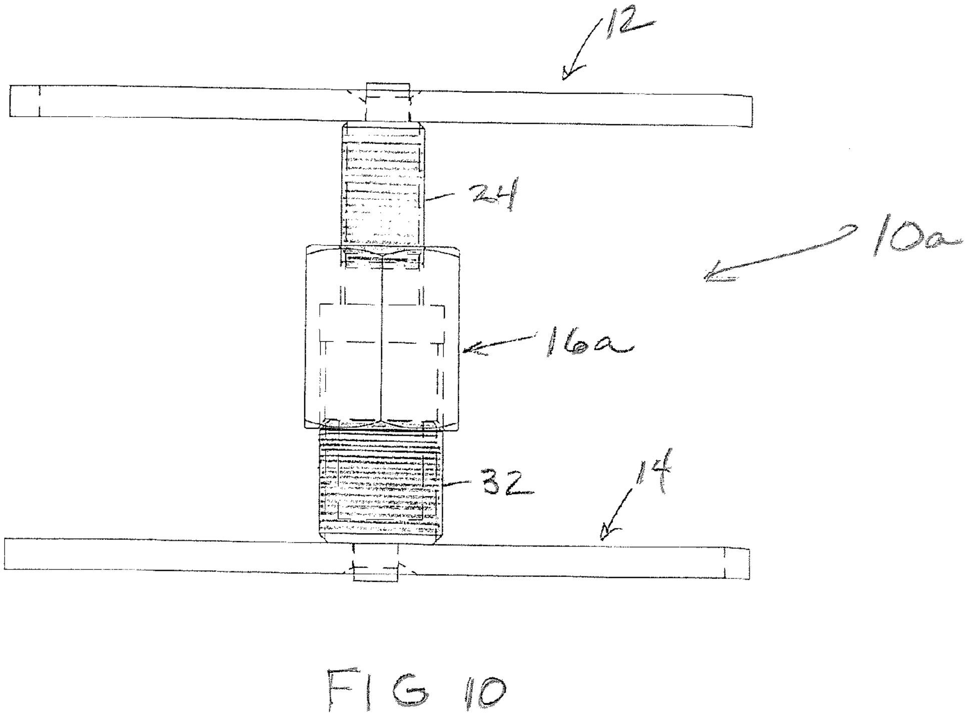

FIGS. 10 and 11 illustrate an alternate embodiment of the tool depicted here by the reference numeral 10*a*. In this example, the ratchet wrench assembly 18 is not included and the coupler 16 is replaced by a coupler 16*a* having an external hex head configuration which is designed to be engaged by a separate wrench in order to rotate the coupler 16*a* and attain the desired lateral movement of the pressure plates 12, 14 between the extended and the retracted positions.

It should be appreciated that the piston retractor tool 10 works on twin and quad piston fixed calipers as well as single and twin piston floating calipers. The centrally located ratchet wrench assembly 18 aids in evenly spreading force so that the plates 12, 14 are always maintained parallel to prevent misalignment of pistons. The wrench assembly 18 also permits a swing over any circular arc of movement so that the tool 10 can be placed at any position. The reversible pawl 62 allows for easy change from spreading to retracting the pressure plates 12, 14 as desired.

Various alternatives are contemplated as being within the scope of the following claims particularly pointing out and distinctly claiming the subject matter regarded as the invention.

What is claimed is:

1. A disc brake piston retractor tool for retracting at least one piston into at least one cylinder bore of a caliper assembly provided with a set of brake pads to be serviced, the tool comprising:

a first pressure plate having an outer surface, and an inner surface provided with an inwardly directed, externally threaded first stud;

a second pressure plate having an outer surface, and an inner surface provided with an inwardly directed, externally threaded second stud;

a coupler having opposite first and second open ends, and an inner surface internally threaded to threadably receive the first stud from the first open end and the second stud from the second open end so that the coupler rotates relative to the first and second studs; and a reversible ratcheting wrench assembly connected to the coupler for providing selective rotation of the coupler relative to the first and second externally threaded studs, wherein selective rotation of the wrench assembly connected to the coupler results in threading and unthreading of the first and second studs and simultaneous lateral movement of the first and second pressure plates towards and away from the coupler between retracted and extended positions, the outer surface of one of the pressure plates being engageable against the at least one piston to retract the piston into the at least one cylinder bore, and the outer surface of the other of the pressure plates being supported against an interior surface of the caliper assembly opposite the one piston, or being engagable against at least one other piston provided for movement relative to at least one other cylinder bore in the caliper assembly opposite the one piston to retract the other piston.

2. The tool of claim 1, wherein the ratcheting wrench assembly includes a spacer bar connected by a rivet arrangement between a pair of handle plates which are rotatably mounted on the coupler.

3. The tool of claim 2, wherein a ratcheting wheel has an inner wall fixed to an outer surface of the coupler between the handle plates, and an outer periphery formed with a plurality of ratchet notches.

4. The tool of claim 3, wherein a reversible pawl is mounted for pivotal movement between the handle plates.

5. The tool of claim 4, wherein the reversible pawl includes teeth which are selectively engageable with the notches on the ratcheting wheel upon pivoting of the pawl.

6. The tool of claim 5, wherein the reversible pawl further includes first and second engagement members and a nose.

7. The tool of claim 6, wherein the reversible pawl is retained in a selected position by a plunger pin which is biased at one end against the nose by a spring located between an opposite end of the plunger pin and the rivet arrangement.

8. The tool of claim 7, wherein the plunger pin and the spring are confined in a slot formed in the spacer bar.

9. The tool of claim 1, wherein the coupler and the wrench assembly are rotatable about an axis that is perpendicular to the first and second pressure plates.

10. A disc brake piston retractor tool for retracting at least one piston into at least one cylinder bore of a caliper assembly provided a set of brake pads to be serviced, the tool comprising:

a first pressure plate having an outer surface, and an inner surface provided with an inwardly directed, externally threaded first stud;

a second pressure plate having an outer surface, and an inner surface provided with an inwardly directly, externally threaded second stud; and a coupler having opposite first and second open ends, and an inner surface internally threaded to threadably receive the first stud from the first open end and the second stud from the second open end so that the coupler rotates relative to the first and second studs, wherein selective rotation of the coupler results in threading and unthreading of the first and second studs and simultaneous lateral movement of the first and second pressure plates towards and away from the coupler between retracted and extended positions, the outer surface of one of the pressure plates being engageable against the at least one piston to retract the piston into the at least one cylinder bore, and the outer surface of the other of the pressure plates being supported against an interior surface of the caliper assembly opposite the one piston, or being engagable against at least one other piston provided for movement relative to at least one other cylinder bore in the caliper assembly opposite the one piston to retract the other piston into the at least one other cylinder bore;

wherein a reversible ratcheting assembly is connected to the coupler for providing the selective rotation of the coupler relative to the first and second studs.

11. The tool of claim 10, wherein the first and second studs extend perpendicularly from the inner surfaces of the first and second pressure plates.

12. The tool of claim 10, wherein one of the first and second studs has a length which is longer than a length of the other of the first and second studs.

13. The tool of claim 10, whereon one of the first and second studs has a threaded diameter which is smaller than a threaded diameter of the other of the first and second studs.

14. The tool of claim 10, wherein one of the first and second studs has an outer end which is threadably received within the other of the first and second studs.

* * * * *

UNITED STATES PATENT AND TRADEMARK OFFICE

CERTIFICATE OF CORRECTION

PATENT NO. : 8,826,504 B1
APPLICATION NO. : 13/545463
DATED : September 9, 2014
INVENTOR(S) : Slivon It is certified that error appears in the above-identified patent and that said Letters Patent is hereby corrected as shown below:

In the Claims

Column 6, line 3 claim 10, after "provided" insert -- with --

Signed and Sealed this
Third Day of February, 2015

Michelle K. Lee

Michelle K. Lee
*Deputy Director of the United States Patent and Trademark Office*